United States Patent
Sahu et al.

(10) Patent No.: US 8,879,002 B2
(45) Date of Patent: *Nov. 4, 2014

(54) SPLIT EDGE ENHANCEMENT ARCHITECTURE

(75) Inventors: Shilpi Sahu, Bangalore (IN); Nikhil Balram, Mountain View, CA (US); Sanjay Garg, Bangalore (IN)

(73) Assignee: Marvell World Trade Ltd., St. Michael (BB)

( * ) Notice: Subject to any disclaimer, the term of this patent is extended or adjusted under 35 U.S.C. 154(b) by 60 days.

This patent is subject to a terminal disclaimer.

(21) Appl. No.: 13/608,694

(22) Filed: Sep. 10, 2012

(65) Prior Publication Data

US 2013/0002959 A1    Jan. 3, 2013

Related U.S. Application Data

(63) Continuation of application No. 12/476,930, filed on Jun. 2, 2009, now Pat. No. 8,264,615.

(60) Provisional application No. 61/073,949, filed on Sep. 19, 2008.

(51) Int. Cl.

| | |
|---|---|
| H04N 7/01 | (2006.01) |
| H04N 11/20 | (2006.01) |
| H04N 5/21 | (2006.01) |
| G06K 9/40 | (2006.01) |
| G06T 5/00 | (2006.01) |
| H04N 5/14 | (2006.01) |

(52) U.S. Cl.
CPC ................ *H04N 5/142* (2013.01); *G06T 5/004* (2013.01)
USPC ........... 348/625; 348/441; 348/448; 348/628; 348/629; 382/254; 382/260; 382/266

(58) Field of Classification Search
None
See application file for complete search history.

(56) References Cited

U.S. PATENT DOCUMENTS

| | | | |
|---|---|---|---|
| 5,420,645 A | 5/1995 | Traa et al. | |
| 6,246,827 B1 | 6/2001 | Strolle et al. | |

(Continued)

FOREIGN PATENT DOCUMENTS

| | | |
|---|---|---|
| JP | H09-284604 | 10/1997 |
| JP | 2004-527171 | 9/2004 |

(Continued)

OTHER PUBLICATIONS

Lin Ping, "An Adaptive Color Transient Improvement Algorithm", IEEE Transactions on Consumer Electronics, pp. 1326-1329, vol. 49, No. 4, Nov. 2003.

(Continued)

*Primary Examiner* — Justin Shepard

(57) ABSTRACT

A system and method for enhancing the detail edges and transitions in an input video signal. This enhancement may be accomplished by enhancing small detail edges before up-scaling and enhancing large amplitude transitions after up-scaling. For example, detail edge enhancement (detail EE) may be used to enhance the fine details of an input video signal. An edge map may be used to prevent enhancing the large edges and accompanying mosquito noise with the detail enhancement. Noise may additionally be removed from the signal. After the fine details are enhanced, the signal may be up-scaled. Luminance transition improvement (LTI) or chrominance transition improvement (CTI) may be used to enhance the large transitions of the input video signal post scaler.

16 Claims, 6 Drawing Sheets

(56) References Cited

U.S. PATENT DOCUMENTS

| | | |
|---|---|---|
| 6,628,842 B1 | 9/2003 | Nagao |
| 6,717,622 B2 | 4/2004 | Lan |
| 2002/0034337 A1* | 3/2002 | Shekter .................. 382/275 |
| 2002/0140854 A1 | 10/2002 | Lan |
| 2003/0107678 A1 | 6/2003 | Lin et al. |
| 2006/0222267 A1* | 10/2006 | Chao ....................... 382/300 |
| 2006/0285767 A1* | 12/2006 | Ali ........................... 382/265 |
| 2007/0160295 A1 | 7/2007 | Wang et al. |
| 2007/0216813 A1 | 9/2007 | Arici et al. |
| 2008/0158147 A1 | 7/2008 | Westerman et al. |
| 2008/0291332 A1 | 11/2008 | Messing et al. |
| 2009/0169128 A1 | 7/2009 | Hentschel et al. |
| 2009/0196518 A1 | 8/2009 | Stein et al. |
| 2009/0220169 A1* | 9/2009 | Bennett et al. ............ 382/268 |

FOREIGN PATENT DOCUMENTS

| | | |
|---|---|---|
| JP | 2007-295224 | 11/2007 |
| WO | 02/080543 | 10/2002 |
| WO | 2005116922 A1 | 12/2005 |

OTHER PUBLICATIONS

Yuki Ishii, et al., "Image Magnification Based on the Multiplicative Skeleton/Texture Separation", 2006 Image Media Processing Symposium (IMP2006), Japan, Nov. 8, 2006.

International Search Report and Written Opinion issued by the European Patent Office as the International Searching Authority, dated Jun. 2, 2009.

Office Action for Japanese Application No. 2011-511906 issued by the Japanese Patent Office, dated Jan. 24, 2012.

Office Action for Chinese Application No. 200980122358.9 issued by the State Intellectual Property Office, dated Jul. 3, 2012 (11 pages).

Translation of Office Action for Chinese Application No. 200980122358.9 issued by the State Intellectual Property Office (10 pages).

* cited by examiner

SPLIT EDGE ENHANCEMENT ARCHITECTURE

CROSS-REFERENCE TO RELATED APPLICATIONS

This is a continuation of U.S. application Ser. No. 12/476,930, filed Jun. 2, 2009, which claims priority from U.S. Provisional Application No. 61/073949, filed Jun. 19, 2008, all the above applications hereby incorporated by reference.

BACKGROUND

1. Field

Aspects of the present invention relate generally to the field of video coding and more specifically to image detail and edge enhancement.

2. Description of the Related Art

An edge enhancer comprising both fine detail enhancement (detail EE) and luminance transition improvement (LTI) may be used to improve the transitions in a video signal. Applied in parallel, detail EE on the small transitions and LTI on the large transitions, the output of an edge enhancer is the sum of the original signal ($Y_{in}$), the detail enhancement ($\Delta Y_{det}$) and the transition improvement ($\Delta LTI$). Detail EE uses the principles of un-sharp masking and causes overshoot or ringing on edges that can enhance small details.

Up-scaling is typically necessary when an input video signal is standard definition (SD), often 480i, and the desired output is high definition (HD), usually 1080i or 1080p. Up-scaling has the effect of enhancing artifacts or imperfections that may exist or be introduced in the video signal. Therefore, when up-scaling a signal, it may be important to verify that the actual details in the video image are enhanced rather than enhancing and propagating imperfections.

When a signal is up-scaled, detail EE performance may be compromised because the overshoot and ringing caused by the enhancement can result in added mosquito noise and augment stray artifacts in the image. Additionally, up-scaling often results in a softening of the image and of the finer details because the higher frequencies in the un-scaled video translate to lower frequencies in the up-scaled video. To implement an effective detail EE after scaling (post-scaler), a new filter design would be required to enhance the frequencies where the real details exist after scaling and would result in a much larger filter that would need to change based on the up-scaling ratio. Therefore detail EE is more effective when implemented before up-scaling.

LTI is a non-linear algorithm for improving transition sharpness on large amplitude edges without causing overshooting or ringing. However, LTI does not noticeably improve small transitions. LTI may artificially introduce frequencies that can create artifacts and introduce aliasing or pixellations known as "jaggies" so LTI is most effective when applied post scaler because the up-scaled signal's frequency spectrum contains space for the added frequencies. Furthermore, the added artifacts and jaggies are more obvious after the enhanced video is up-scaled. Therefore, when an edge enhancer comprising both detail EE and LTI is applied pre-scaler, the LTI enhancement does not work as expected, and when applied post-scaler, the detail EE does not work as expected.

SUMMARY

Embodiments of the present invention provide a system and method for enhancing the detail edges and transitions in an input video signal. The method may be accomplished by enhancing a plurality of small details in an input video signal, scaling the enhanced video signal, and enhancing a plurality of large amplitude transitions after up-scaling. Detail edge enhancement (detail EE) may be used to enhance fine details and luminance transition improvement (LTI) or chrominance transition improvement (CTI) may be used to enhance large transitions. Separation of the detail enhancement and the large edge enhancement may be accomplished by enhancing the fine details and then up-scaling the signal, and separately up-scaling the input video signal then enhancing the large transitions, then combining the two enhanced, up-scaled signals. Enhancing the fine details of the signal may include filtering, reducing noise contained in the signal, and gaining the input video signal. Detail enhancement may include using a large edge map to prevent enhancing the large edges and accompanying mosquito noise. Enhancing large amplitude transitions may include calculating a second derivative of the scaled video signal, creating a pixel kernel from the pixels of the scaled signal, determining the minimum and maximum pixel values in the pixel kernel, and biasing the scaled signal towards the maximum pixel value if the second derivative is a positive number, or towards the minimum pixel value if the second derivative is a negative number. The system may contain components suitable for performing such a method, but may not be limited to such performance.

BRIEF DESCRIPTION OF THE DRAWINGS

The present invention is described herein with reference to the accompanying drawings, similar reference numbers being used to indicate functionally similar elements.

DETAILED DESCRIPTION OF EMBODIMENTS

Objects and advantages of the present invention will become apparent from the following detailed description.

Figure 1A:
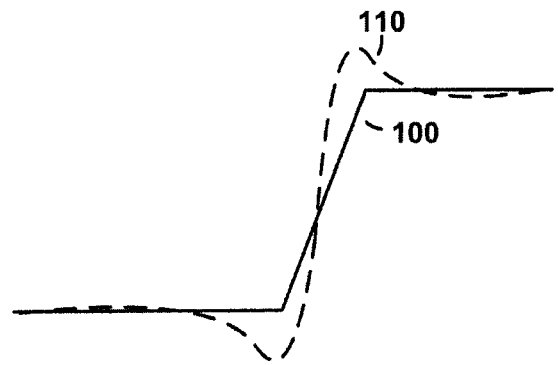
FIGS. 1A and 1B show the effect of different kinds of enhancement on a transition.
Figure 1B:
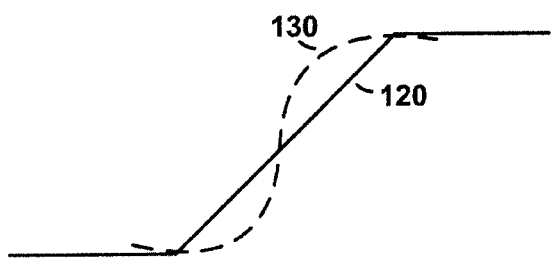

The split edge enhancer may separate fine detail enhancement (detail EE) and luminance transition improvement (LTI) such that detail EE can occur pre-scaler and LTI can occur post-scaler. The effect of detail EE on a transition is shown in FIG. 1A. The original feature 100 may be enhanced in 110 by detail EE so as to emphasize the transition. While this emphasis is beneficial on fine details and textures composed of low amplitude edges, such enhancement is undesirable on large transitions. The effect of LTI on a transition is shown in FIG. 1B. The original feature 120 may be enhanced in 130 by LTI so as to emphasize the transition.

Figure 2:
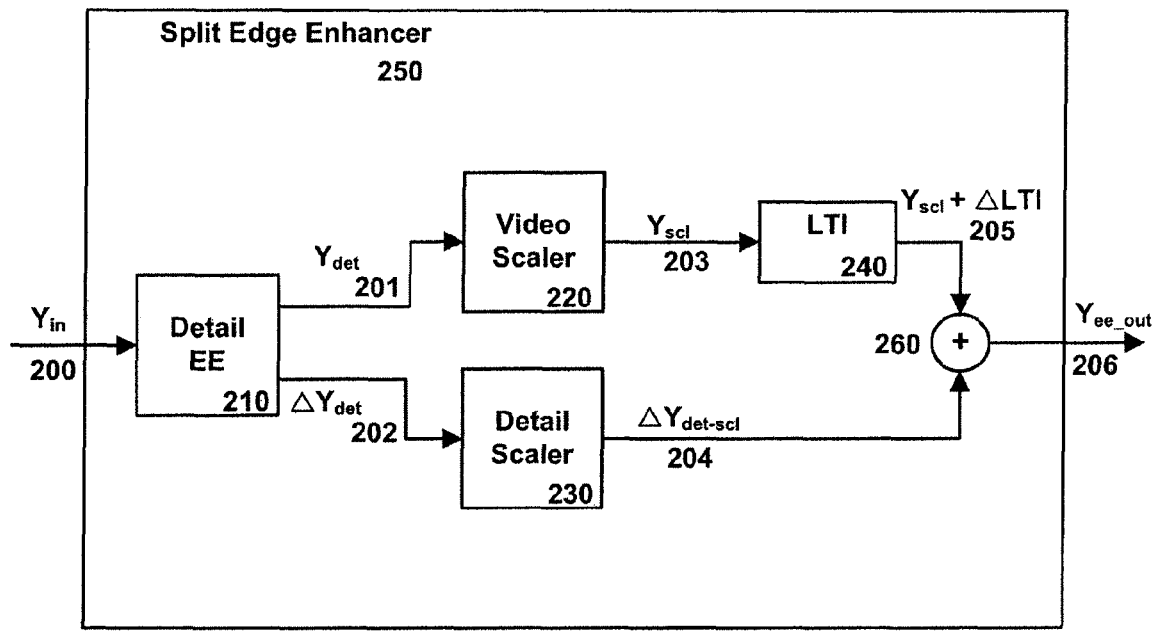
FIG. 2 shows a simplified block diagram of one embodiment of split edge enhancement architecture.

FIG. 2 illustrates an embodiment of split edge enhancement architecture. A video signal $Y_{in}$ 200 may be input into a split edge enhancer 250 comprising both a detail EE module 210 and an LTI module 240. Video signal $Y_{in}$ 200 may first be input into detail EE module 210. Detail EE module 210 may output a detail signal, $\Delta Y_{det}$ 202, which may represent the enhanced fine details of the video signal. Detail signal $\Delta Y_{det}$ 202 may then be up-scaled at detail scaler 230 and post-scaler signal $\Delta Y_{det\text{-}scl}$ 204 may be output. Another output of detail EE module 210 may be $Y_{det}$ 201. $Y_{det}$ 201 may be input video signal $Y_{in}$ 200 passed through detail EE module 210 without adjustment, or $Y_{det}$ 201 may be detail signal $\Delta Y_{det}$ 202 added to input video signal $Y_{in}$ 200 to create a video signal with fine details enhanced. $Y_{det}$ 201 may then be up-scaled through video scaler 220, and scaled signal $Y_{scl}$ 203 may then be input into transition improvement module LTI 240. The two scalers, 220 and 230, may further contain filters that may have the same or different scaler filters. Scaled signal $Y_{scl}$ 203 plus the LTI improvement $\Delta$LTI output may be the output ($Y_{scl}+\Delta$LTI 205) of LTI module 240. Output signal $Y_{scl}+\Delta$LTI 205 may then be added to scaled detail enhanced signal $\Delta Y_{det\text{-}scl}$ 204 in the spatial domain at 260 such that the final output of split edge enhancer 250, $Y_{ee\text{-}out}$ 206 may be the edge enhanced and scaled signal.

Figure 3:
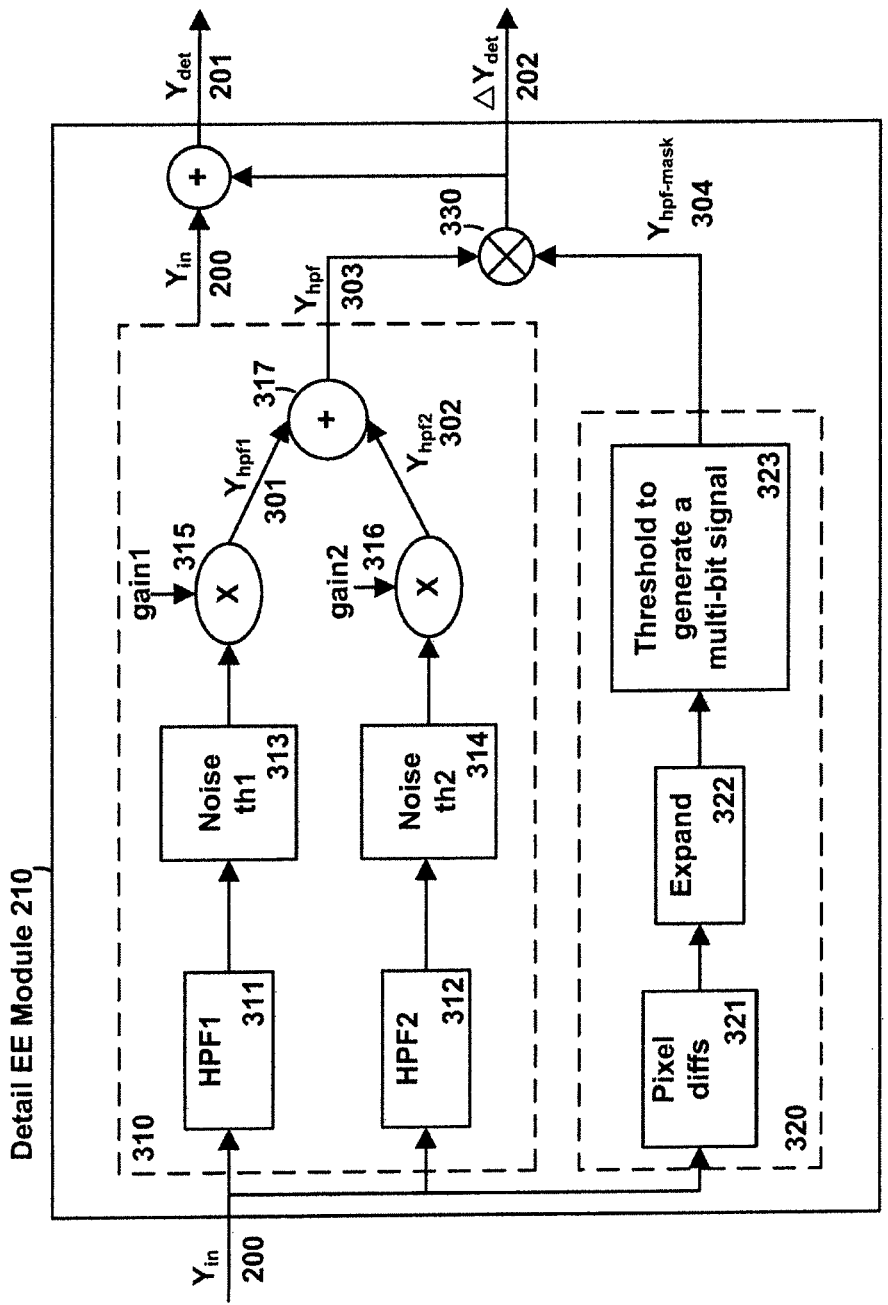
FIG. 3 shows a simplified block diagram illustrating components of one embodiment of a fine detail enhancer.

FIG. 3 illustrates an embodiment of a fine detail enhancer 210. There are two primary components to detail enhancer 210: a detail calculator 310 and a large edge map 320. Detail calculator 310 works on the principle of un-sharp masking. As such, input video signal $Y_{in}$ 200 is passed through a filter. As shown, input video signal $Y_{in}$ 200 may be passed through two parallel high pass filters (HPF) 311 and 312, one for horizontal edges and the other for vertical edges. Alternatively, a 2D omni-directional filter, or a band pass filter (BPF) to limit artifacts such as mosquito noise may be used. The separate paths may additionally consist of noise filters 313 and 314. Here, noise filter 313 or 314 may subtract a noise threshold, th1 or th2, from the signal amplitude. The thresholds may be programmable based on the amount of noise in a given video feed. The threshold values may be stored in programmable registers and may be a constant value selected by a user. Additionally, there are several known methods for estimating the noise contained in a video signal, for example block based, smoothing based, or wavelet based noise estimation may be implemented to determine the amount of noise in a video signal. The noise contained in input video signal $Y_{in}$ 200 may be estimated in the video coding system and provided to split edge enhancer 250 via programmable registers to adjust programmable noise thresholds th1 and th2. The signal may then be multiplied by programmable gains 315 and 316 to yield output signals $Y_{hpf1}$ 301 and $Y_{hpf2}$ 302. The programmable gains may be constant values stored in programmable registers. Outputs of the two paths, $Y_{hpf1}$ 301 and $Y_{hpf2}$ 302, may then be added together by adder 317 to yield final detail signal $Y_{hpf}$ 303.

Detail signal $Y_{hpf}$ 303 generated by detail calculator 310 may contain undesirable ringing at the large amplitude edges. To correct for any undesirable enhancement on large transitions, a second portion of detail EE module 210, large edge map 320, may use an edge map to differentiate between fine details and large transitions. A large edge map can cover the large edges and may typically also cover the mosquito noise prevalent near large edges so that the detail signal is not enhanced in those areas. In large edge map 320, pixel differentiator 321 may evaluate pixels in the video signal image to identify large edges or transitions. Those pixels identified as belonging to a large edge may be selected to create an edge map. The edges may then be expanded horizontally and vertically at module 322 to confirm that the edges and any surrounding mosquito noise are well covered by the edge map. To expand the edges of an edge map, additional pixels surrounding an identified large edge, horizontally and vertically, are also selected as part of the edge. The resulting edge map may then reflect the inclusion of the additional pixels as part of the identified edges. The signal may then be thresholded to generate a multi-bit signal at module 323. The multi-bit signal may be a 0-16 bit signal, correspondingly, there may be up to 15 threshold values used to determine the multi-bit signal. The threshold values may be stored in programmable registers. Alternatively, the thresholds may be determined by a base/step method wherein the first threshold is the base level and each additional threshold is a step up from the base. The output of large edge map 320, $Y_{hpf\text{-}mask}$ 304, may be an edge map. When combined with detail signal $Y_{hpf}$ 303 at module 330, the result detail signal $\Delta Y_{det}$ 202 may be the gained fine details of the input video signal $Y_{in}$ 200 without enhancements on the large edges. As shown in FIG. 3, if the result detail signal $\Delta Y_{det}$ 202 is added to input video signal $Y_{in}$ 200, signal $Y_{det}$ 201 may be a complete detailed signal.

Referring back to FIG. 2, after passing through detail EE module 210, signal $Y_{det}$ 201 may be up-scaled at video scaler 220. Although it is possible to implement edge enhancement without scaling, up-scaling the video signal is often required when the desired output signal is 1080p or 1080i as most source video is 480p, 680p, or possibly 720p. As previously mentioned, up-scaling usually results in a softer image and a loss of the finer details. This is because up-scaling typically involves a low pass filter (LPF) which can cause degradation of the edges. However, with the earlier gaining of the detailed signal in detail EE module 210, the degradation of detail signal $\Delta Y_{det}$ 202 may be minimal. When the fine details are gained up at 315 and 316, attenuation due to low pass filtering may be limited, and more fine details may persist than would otherwise be the case. Additionally, real details of a video signal often contain a good spread of frequencies; primarily around band pass and high pass frequency regions. Consequently, an LPF in scalers 220 or 230 may attenuate only some of the higher frequencies, leaving most of the detail features undisturbed.

Figure 4:
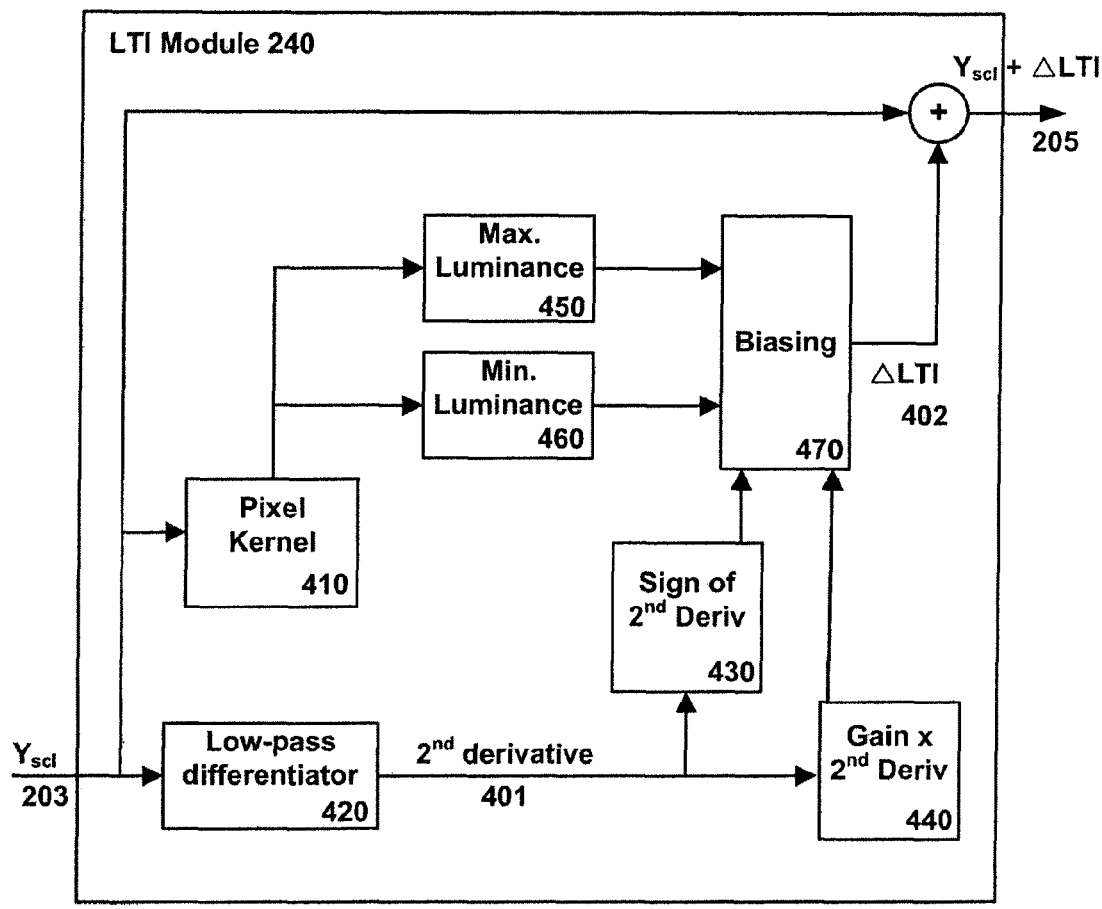
FIG. 4 shows a simplified block diagram of one embodiment of a luminance transition improvement module.

Luminance transition improvement (LTI) may be applied after up-scaling to mitigate any softening of the image that can be caused by the scaling filter. LTI can be applied in both the horizontal and vertical directions. In one embodiment, horizontal improvement can be achieved by LTI module 240 as shown in FIG. 4. Scaled signal $Y_{scl}$ 203 may be passed through a low pass differentiator 420 in the horizontal direction to yield second derivative equivalent 401 of the low pass filtered signal. Low pass differentiators are known in the art, for example a differentiator may be implemented with a simple RC circuit. The second derivative equivalent 401 may be quite small for fine details, especially after scaling and filtering the signal. This additionally may have the benefit of ensuring that LTI module 240 does not significantly affect the fine details of the video signal. A kernel may then be formed at module 410 around a pixel of interest, for example, a kernel consisting of 7 pixels may be sufficient. The maximum and minimum luminance values of the pixels in the kernel may then be determined at modules 450 and 460 respectively.

Second derivative equivalent 401 may have both a sign and a magnitude. At module 430, the sign of second derivative equivalent may be determined. If, at module 430, second derivative equivalent 401 is less than zero, the sign is negative and scaled signal $Y_{scl}$ 203 can be biased towards the minimum luminance value determined at module 460. If, at module 430, second derivative equivalent 401 is equal to zero, no biasing is required. If, at module 430, second derivative equivalent 401 is greater than zero, the sign is positive and scaled signal $Y_{scl}$ 203 may be biased towards the maximum luminance value determined at module 450.

The magnitude of second derivative equivalent 401 may be used to calculate the amount of bias that may be applied to scaled signal $Y_{scl}$ 203. The amount scaled signal $Y_{scl}$ 203 is biased at module 470 may be determined as the product of a programmable gain value and the magnitude of second derivative equivalent 401 calculated at module 440. The programmable gain value may be a constant value stored in a programmable register. Biasing the signal using second derivative equivalent 401 allows a transient improvement that may gradually increase with the edge amplitude to yield a natural looking LTI output. The output of LTI module 240 may be the input to the module, scaled signal $Y_{scl}$ 203 plus the LTI improvement, $\Delta$LTI 402 to yield output signal $Y_{scl}$+$\Delta$LTI 205.

Figure 5:
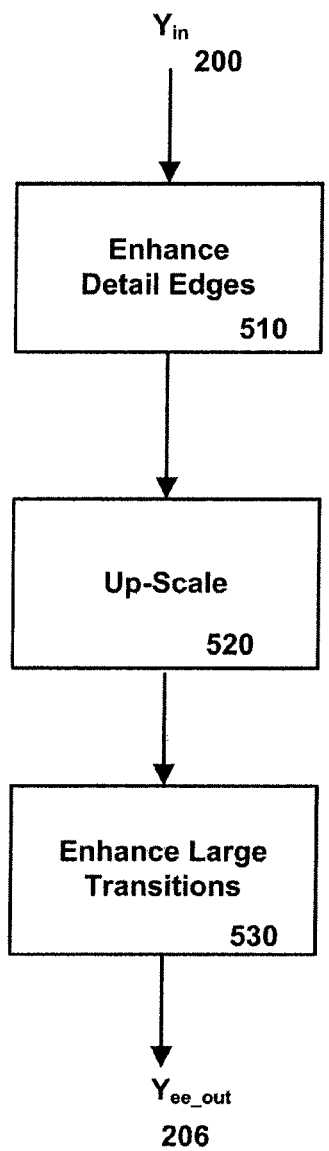
FIG. 5 is a simplified flow diagram illustrating general operation of one embodiment of a method of enhancing a video signal with split edge enhancement architecture.

FIG. 5 is a simplified flow diagram illustrating general operation of one embodiment of a method of enhancing a video signal with split edge enhancement architecture. Splitting the enhancement of fine detail edges in a video signal and the enhancement of large transitions with a scaler may provide for edge enhancement with minimal enhancement of inherent or introduced artifacts. At block 510, the fine details of input video signal $Y_{in}$ 200 may be enhanced. This may be accomplished with detail EE. At block 520, the detail enhanced signal may be up-scaled. At block 530, the large transitions in the up-scaled signal may then be enhanced. This may be accomplished with LTI to improve luminance transitions in the up-scaled signal, outputting LTI and detail EE enhanced up-scaled output signal $Y_{ee\_out}$ 206.

Figure 6:
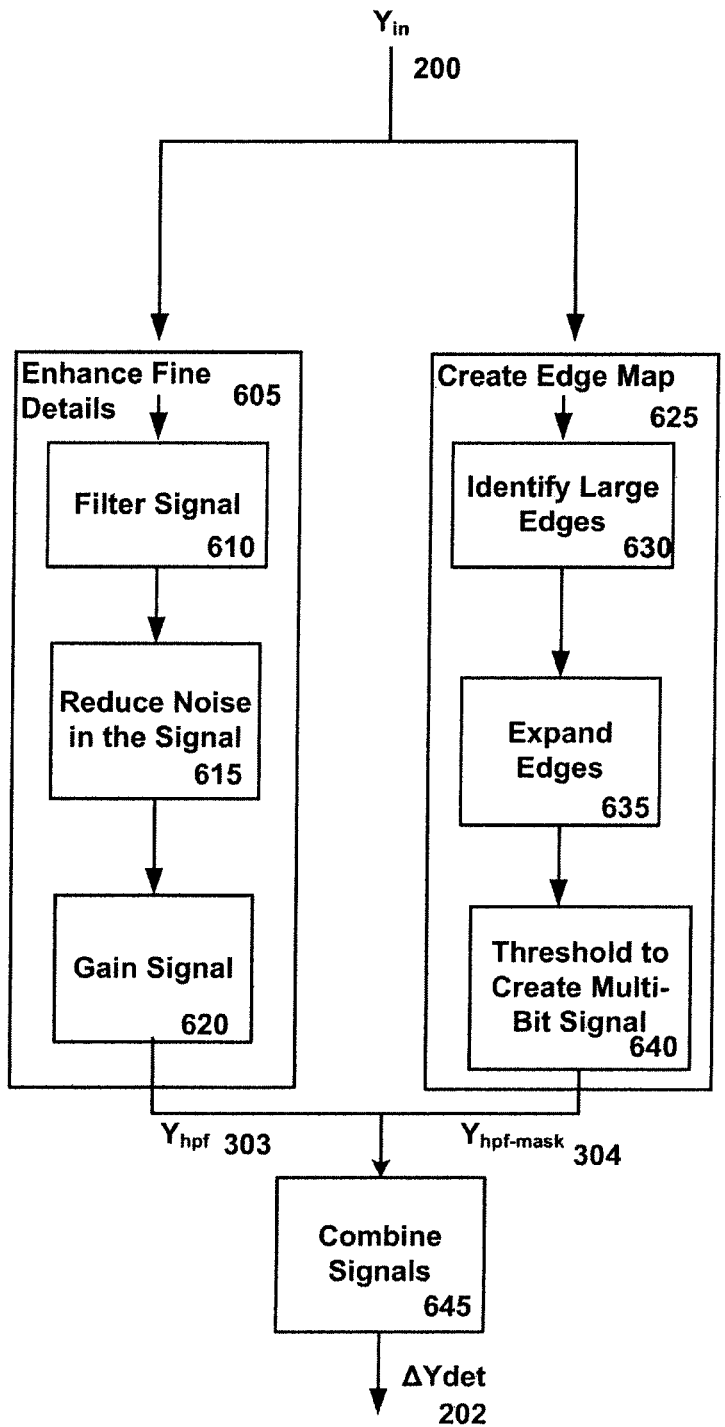
FIG. 6 is a simplified flow diagram illustrating general operation of one embodiment of a method of enhancing fine detail edges of a video signal with a detail edge enhancer.

FIG. 6 is a simplified flow diagram illustrating general operation of one embodiment of a method of enhancing fine detail edges of a video signal. At block 605, the fine details of input video signal $Y_{in}$ 200 may be enhanced. This may be accomplished with detail EE. The operation of detail edge enhancement block 605 may further include block 610 that may filter input video signal $Y_{in}$ 200, block 615 that may reduce noise in the filtered signal, and block 620 that may provide gain to the noise reduced signal. Filtering the input video signal $Y_{in}$ 200 at block 610 may be executed with a suitable filter, for example a high pass filter (HPF), a 2D omni-directional filter, or a band pass filter (BPF) to limit artifacts in the signal. Reducing noise in the filtered signal at block 615 may be executed with known noise filters, or by removing a programmable noise threshold value from the filtered signal. A programmable noise threshold may be determined by known methods, for example by wavelet based, block based, or smoothing based methods for estimating noise in a signal. Gaining the filtered signal at block 620 may be completed by multiplying the filtered and noise reduced signal with a programmable gain. Edge enhancement block 605 may then output a filtered, noise reduced, gained signal $Y_{hpf}$ 303.

Detail enhancement of large transitions may be undesirable; therefore, at block 625, detail edge enhancement may further include creating an edge map to differentiate between fine details and large transitions. A large edge map can cover the large edges and may typically also cover the mosquito noise prevalent near large edges so that the detail signal is not enhanced in those areas. Creating a large edge map at operational block 625 may further include blocks 630, 635 and 640. At block 630, pixels in input video signal $Y_{in}$ 200 may be evaluated to identify large edges or transitions. Those pixels identified as belonging to a large edge may be selected to create an edge map. At block 635, edges in the edge map may be expanded horizontally and vertically so that the identified edges and any surrounding mosquito noise are well covered by the edge map. To expand the edges of an edge map, additional pixels surrounding an identified detail edge, horizontally and vertically, may also be selected as part of the edge. The resulting edge map may then reflect the inclusion of the additional pixels as part of the identified edges. At block 640, the signal may be thresholded to generate a multi-bit signal. Output of edge map creation block 625 may be edge map $Y_{hpf\text{-}mask}$ 304. Detail signal $Y_{hpf}$ 303 and edge map $Y_{hpf\text{-}mask}$ 304 may be combined at block 645 to output result signal $\Delta Y_{det}$ 202 that may have gained fine details without enhancements on the large edges.

It is noted that the arrangements of the blocks in FIG. 5 and FIG. 6 do not necessarily imply a particular order or sequence of events, nor is it intended to exclude other possibilities. For example, the operations depicted at 610 and 615 or at 630 and 635 may occur substantially simultaneously with each other.

Although the above embodiments have been described as being primarily for luminance signal enhancement, they could also be applied to chrominance signal enhancement.

While the invention has been described in detail above with reference to some embodiments, variations within the scope and spirit of the invention will be apparent to those of ordinary skill in the art. Thus, the invention should be considered as limited only by the scope of the appended claims.

The invention claimed is:

1. A method comprising:
    receiving a video signal that includes fine detail edges and large edges, wherein the large edges have a greater transition in the image relative to the fine detail edges;
    differentiating, based on the greater transition, the large edges in the video signal from the fine detail edges in video signal;
    enhancing the fine detail edges in the video signal without enhancing the large edges in the video signal to yield a first detail-enhanced signal;
    scaling the first detail-enhanced signal to convert the first detail-enhanced signal from a first display resolution to a second display resolution;
    scaling the video signal including both the fine detail edges and the large edges to convert the video signal from the first display resolution to the second display resolution;
    enhancing the large edges in the scaled video signal without enhancing the fine detail edges in the scaled video signal to yield a second detail-enhanced signal; and
    combining the first detail-enhanced signal with the second detail-enhanced signal.

2. The method of claim 1, wherein enhancing the fine detail edges in the video signal without enhancing the large edges in the video signal includes:
    high-pass filtering and gaining of the video signal to enhance the video signal; and
    applying a large-edge mask to the enhanced video signal to mask out enhancements of the large edges in the video signal.

3. The method of claim 1, wherein enhancing the fine detail edges in the video signal without enhancing the large edges in the video signal includes:
    high-pass filtering and gaining horizontal edges of the video signal to yield a horizontal-edge-enhanced signal; and
    separately high-pass filtering and gaining vertical edges of the video signal to yield a vertical-edge-enhanced signal; and
    combining the horizontal-edge-enhanced signal with the vertical-edge-enhanced signal to yield the first detail-enhanced signal.

4. The method of claim 1, wherein the first detail-enhanced signal and the second detail-enhanced signal are combined by adding the first detail-enhanced signal to the second detail-enhanced signal to yield a final output signal.

5. The method of claim 4, wherein enhancing the large edges in the scaled video signal comprises applying a luminance transition improvement (LTI) to the scaled video signal including both the fine detail edges and the large edges.

6. The method of claim 4, wherein enhancing the large edges in the scaled video signal comprises applying a chrominance transition improvement (CTI) to the scaled video signal including both the fine detail edges and the large edges.

7. The method of claim 4, wherein enhancing the large edges in the scaled video signal includes applying, to the scaled video signal including both the fine detail edges and the large edges, a luminance bias that is a positive function of a second derivative of the scaled video signal including both the fine detail edges and the large edges.

8. The method of claim 7, wherein the second derivative is in the horizontal direction.

9. The method of claim 7, further comprising:
determining a minimum pixel value and a maximum pixel value,
wherein enhancing the large edges in the scaled video signal includes biasing the scaled video signal including both the fine detail edges and the large edges i) towards the maximum pixel value if the second derivative is a positive number, and ii) towards the minimum pixel value if the second derivative is a negative number.

10. The method of claim 1, wherein differentiating the large edges in the video signal from the fine detail edges in video signal includes
evaluating pixels in the video signal to identify large edges in the video signal,
expanding each identified large edge horizontally and vertically, and
selecting additional pixels, that surround the respective identified large edge, to be included in the respective edge.

11. A method comprising:
receiving a video signal;
enhancing the video signal to yield a detail-enhanced signal by
high-pass filtering and gaining horizontal edges of the video signal to yield a horizontal-edges-enhanced signal,
high-pass filtering and gaining vertical edges of the video signal to yield a vertical-edge-enhanced signal, and
combining the horizontal-edge-enhanced signal with the vertical-edge-enhanced signal to yield the detail-enhanced signal, wherein the enhancing of the video signal enhances fine detail edges in the video signal without enhancing large edges in the video signal;
scaling the detail-enhanced signal to yield a scaled detail-enhanced signal, wherein the detail-enhanced signal has a first display resolution and the scaled detail-enhanced signal has a second display resolution;
scaling the video signal to yield a scaled input signal, wherein the video signal has the first display resolution and the scaled input signal has the second display resolution;
enhancing preferentially the large edges of the scaled input signal to yield a large-edge-enhanced scaled signal; and
adding the large-edge-enhanced scaled signal to the scaled detail-enhanced signal to yield a final output signal.

12. The method. of claim 11, wherein the enhancing of the fine detail edges in the video signal without enhancing the large edges in the video signal includes:
applying a large-edge mask to the detail-enhanced signal to mask out enhancements of the large edges in the detail-enhanced signal.

13. A system comprising:
a large-edge map configured to (i) receive a video signal that includes fine detail edges and large edges, wherein the large edges have a greater transition in the image relative to the fine detail edges and (ii) to differentiate, based on the greater transition, the large edges of the video signal from the fine detail edges in the video signal;
a detail calculator configured to enhance the fine detail edges in the video signal without enhancing the large edges in the video signal to yield a first detail-enhanced signal;
a video scaler configured to scale the first detail-enhanced signal, wherein the scaling of the first detail-enhanced signal converts the first detail-enhanced signal from a first display resolution to a second display resolution;
a second video scaler for scaling the video signal to yield a scaled signal, wherein the video signal has the first display resolution and the scaled signal has the second display resolution;
a large-edge enhancer for enhancing the large edges of the scaled signal to yield a second detail-enhanced signal; and
an adder for adding the second detail-enhanced signal to the scaled first detail-enhanced signal to yield a final output signal.

14. The system of claim 13, wherein the detail calculator includes a high-pass filter and a gain device to enhance the video signal.

15. The system of claim 13, further comprising an adder that combines the enhanced signal with a mask output of the large-edge map to mask out enhancements of the large edges.

16. The system of claim 13, wherein the detail calculator includes high-pass filters and gains horizontal edges of the input video signal to yield a horizontal-edge-enhanced signal, and separately high-pass filters and gains vertical edges of the video signal to yield a vertical-edge-enhanced signal, and combines the horizontal-edge-enhanced signal with the vertical-edge-enhanced signal.

* * * * *